(12) United States Patent
Mian et al.

(10) Patent No.: US 9,164,510 B2
(45) Date of Patent: Oct. 20, 2015

(54) STRAIGHT LINE PATH PLANNING

(71) Applicant: International Electronic Machines Corporation, Troy, NY (US)

(72) Inventors: Zahid F. Mian, Loudonville, NY (US); Brian M. Berard, Malden, MA (US); Ryk E. Spoor, Troy, NY (US)

(73) Assignee: International Electronic Machines Corp., Troy, NY (US)

( * ) Notice: Subject to any disclaimer, the term of this patent is extended or adjusted under 35 U.S.C. 154(b) by 115 days.

(21) Appl. No.: 13/941,482

(22) Filed: Jul. 13, 2013

(65) Prior Publication Data

US 2014/0018996 A1 Jan. 16, 2014

Related U.S. Application Data

(60) Provisional application No. 61/741,147, filed on Jul. 13, 2012.

(51) Int. Cl.
*G05D 1/02* (2006.01)
*G01C 21/00* (2006.01)

(52) U.S. Cl.
CPC ............ *G05D 1/0212* (2013.01); *G05D 1/0217* (2013.01); *G05D 1/0274* (2013.01)

(58) Field of Classification Search
CPC ............................. G05D 1/0212; G05D 1/274
See application file for complete search history.

(56) References Cited

U.S. PATENT DOCUMENTS

| 5,006,988 | A | | 4/1991 | Borenstein et al. |
| 5,650,703 | A | * | 7/1997 | Yardley et al. ................. 318/587 |
| 6,837,106 | B2 | * | 1/2005 | Etkin et al. ................... 73/382 G |
| 7,079,943 | B2 | * | 7/2006 | Flann et al. ................... 701/423 |
| 7,248,968 | B2 | * | 7/2007 | Reid .............................. 701/301 |
| 2003/0132855 | A1 | * | 7/2003 | Swan ....................... 340/825.49 |
| 2003/0227392 | A1 | * | 12/2003 | Ebert et al. ............... 340/825.49 |
| 2005/0187678 | A1 | | 8/2005 | Myeong et al. |
| 2008/0051985 | A1 | * | 2/2008 | D'Andrea et al. ............ 701/200 |

(Continued)

FOREIGN PATENT DOCUMENTS

| JP | 2006099409 | 4/2006 |
| KR | 1020050082541 | 8/2005 |

OTHER PUBLICATIONS

Dijkstra's algorithm, retrieved from "http://en.wikipedia.org/w/index.php?title=Dijkstra%27s_algorithm&oldid=585699926" on Dec. 13, 2013, 8 pages.

(Continued)

*Primary Examiner* — James Trammell
*Assistant Examiner* — Demetra Smith-Stewart
(74) *Attorney, Agent, or Firm* — LaBatt, LLC

(57) ABSTRACT

A solution for navigating a vehicle is provided. The vehicle is navigated from a start location to a target location using a set of linear paths. A current linear path is identified between a current location of the vehicle and the target location. At least a portion of the current linear path is evaluated for a presence of an obstacle. In response to no obstacle being present along the current linear path, the vehicle is instructed to travel along the current linear path to the target location. In response to an obstacle being present, the vehicle is instructed to travel along a different linear path from the current location to an intermediate location, which is selected based on an extent of the obstacle and the current linear path. The process can be repeated until the vehicle arrives at the target location.

21 Claims, 4 Drawing Sheets

(56) References Cited

U.S. PATENT DOCUMENTS

2008/0086241 A1* 4/2008 Phillips et al. .................. 701/2
2008/0133131 A1 6/2008 Poreda et al.
2009/0088912 A1* 4/2009 Rajaraman ..................... 701/19
2010/0063663 A1 3/2010 Tolstedt et al.
2010/0131078 A1* 5/2010 Brown et al. .................. 700/17
2010/0241289 A1* 9/2010 Sandberg ........................ 701/2

OTHER PUBLICATIONS

A* search algorithm, retrieved from "http://en.wikipedia.org/w/index.php?title=A*_search_algorithm&oldid=585915928" on Dec. 13, 2013, 8 pages.
Ahn, International Search Report for PCT/US2013/050277, Nov. 25, 2013, 10 pages.

* cited by examiner

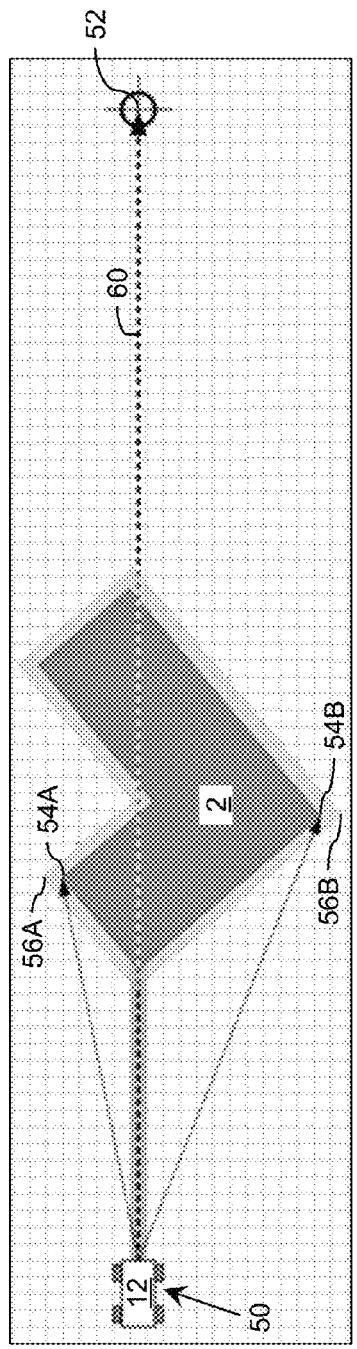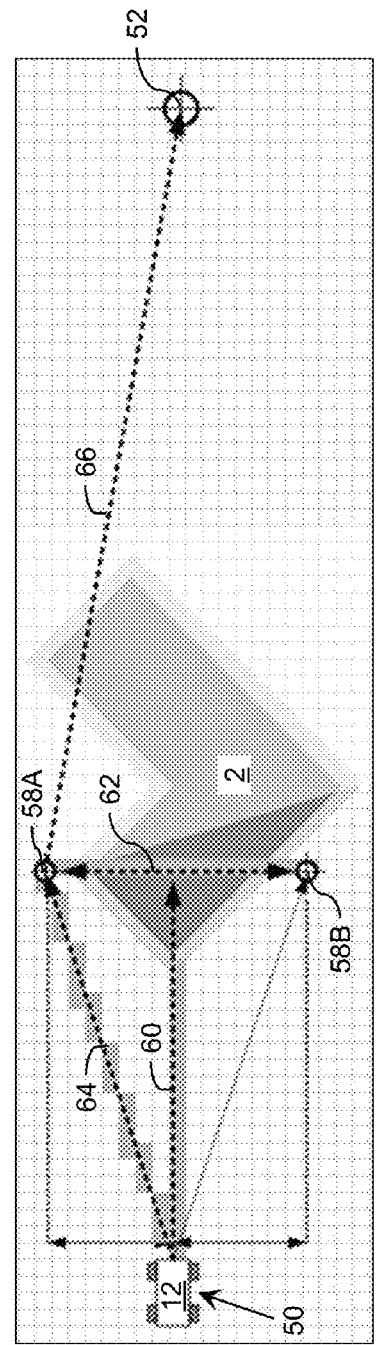

STRAIGHT LINE PATH PLANNING

REFERENCE TO RELATED APPLICATIONS

The current application claims the benefit of U.S. Provisional Application No. 61/741,147, titled "Efficient, adaptive straight line path planner," which was filed on 13 Jul. 2012, and which is hereby incorporated by reference.

TECHNICAL FIELD

The disclosure relates generally to path planning, and more particularly, to a solution for efficiently planning a path to a destination that avoids obstacles.

BACKGROUND ART

To date, current systems use various path-planning approaches, often derived from network theory. These approaches search large portions of an entire path space during processing for obstacle avoidance. In essence, the processing required for these approaches (e.g., Dijkstra's method, A* path planning, and/or the like) increases according to a total area of the "cost map," or region of interest. In particular, the processing increases in proportion to the square of the increase of the linear dimensions of the region of interest. As a result, the processing required to implement these approaches quickly exceeds the ability of various applications, such as small, portable systems, to readily accommodate, especially while performing other tasks of interest to an operator of portable system (e.g., an unmanned vehicle).

The increase in processing is partially due to the assumption that way finding and path planning are proactive processes, which must be exhaustively performed by the onboard system of the portable system. Many such approaches calculate cost values for each "cell" in this cost map which are dependent on evaluating the distance, or cost, to the portable system to reach each one, often without considering more obvious heuristics as "am I now backing up rather than moving forward." This leads to many approaches which proactively check and determine path costs through cost map cells which would actually cause the vehicle to back up unnecessarily, even though in the end that course is not selected.

SUMMARY OF THE INVENTION

Aspects of the invention provide a solution for navigating a vehicle. The vehicle is navigated from a start location to a target location using a set of linear paths. A current linear path is identified between a current location of the vehicle and the target location. At least a portion of the current linear path is evaluated for a presence of an obstacle. In response to no obstacle being present along the current linear path, the vehicle is instructed to travel along the current linear path to the target location. In response to an obstacle being present, the vehicle is instructed to travel along a different linear path from the current location to an intermediate location, which is selected based on an extent of the obstacle and the current linear path. The process can be repeated until the vehicle arrives at the target location.

A first aspect of the invention provides a method comprising: a computer system automatically navigating a vehicle from a current location to a target location, wherein the navigating includes: selecting a set of linear paths for the vehicle to travel between the current location and the target location, the selecting including, for each linear path in the set of linear paths: identifying a current linear path between the current location and the target location; evaluating a set of cells along the current linear path for a presence of an obstacle; instructing the vehicle to travel along the current linear path in response to evaluating all cells between the current location and the target location along the current linear path as not including an obstacle; and in response to evaluating a cell in the set of cells as including an obstacle, instructing the vehicle to travel along a distinct linear path from the current location to an intermediate location, wherein the intermediate location is selected based on an extent of the obstacle and the current linear path.

A second aspect of the invention provides a system comprising: a computer system to manage movement of a vehicle by performing a method comprising automatically navigating the vehicle from a current location to a target location, wherein the navigating includes: selecting a set of linear paths for the vehicle to travel between the current location and the target location, the selecting including, for each linear path in the set of linear paths: identifying a current linear path between the current location and the target location; evaluating a set of cells along the current linear path for a presence of an obstacle; instructing the vehicle to travel along the current linear path in response to evaluating all cells between the current location and the target location along the current linear path as not including an obstacle; and in response to evaluating a cell in the set of cells as including an obstacle, instructing the vehicle to travel along a distinct linear path from the current location to an intermediate location, wherein the intermediate location is selected based on an extent of the obstacle and the current linear path.

A third aspect of the invention provides a computer program product comprising program code stored on at least one computer-readable storage medium, which when executed, enables a computer system to implement a method of managing movement of a vehicle, the method comprising: automatically navigating a vehicle from a current location to a target location, wherein the navigating includes: selecting a set of linear paths for the vehicle to travel between the current location and the target location, the selecting including, for each linear path in the set of linear paths: identifying a current linear path between the current location and the target location; evaluating a set of cells along the current linear path for a presence of an obstacle; instructing the vehicle to travel along the current linear path in response to evaluating all cells between the current location and the target location along the current linear path as not including an obstacle; and in response to evaluating a cell in the set of cells as including an obstacle, instructing the vehicle to travel along a distinct linear path from the current location to an intermediate location, wherein the intermediate location is selected based on an extent of the obstacle and the current linear path.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIGS. 3A-3C show a vehicle traveling from a first location to a target location according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for navigating a vehicle. The vehicle is navigated from a start location to a target location using a set of linear paths. A current linear path is identified between a current location of the vehicle and the target location. At least a portion of the current linear path is evaluated for a presence of an obstacle. In response to no obstacle being present along the current linear path, the vehicle is instructed to travel along the current linear path to the target location. In response to an obstacle being present, the vehicle is instructed to travel along a different linear path from the current location to an intermediate location, which is selected based on an extent of the obstacle and the current linear path. The process can be repeated until the vehicle arrives at the target location. As used herein, unless otherwise noted, the term "set" means one or more (i.e., at least one) and the phrase "any solution" means any now known or later developed solution.

Figure 1:
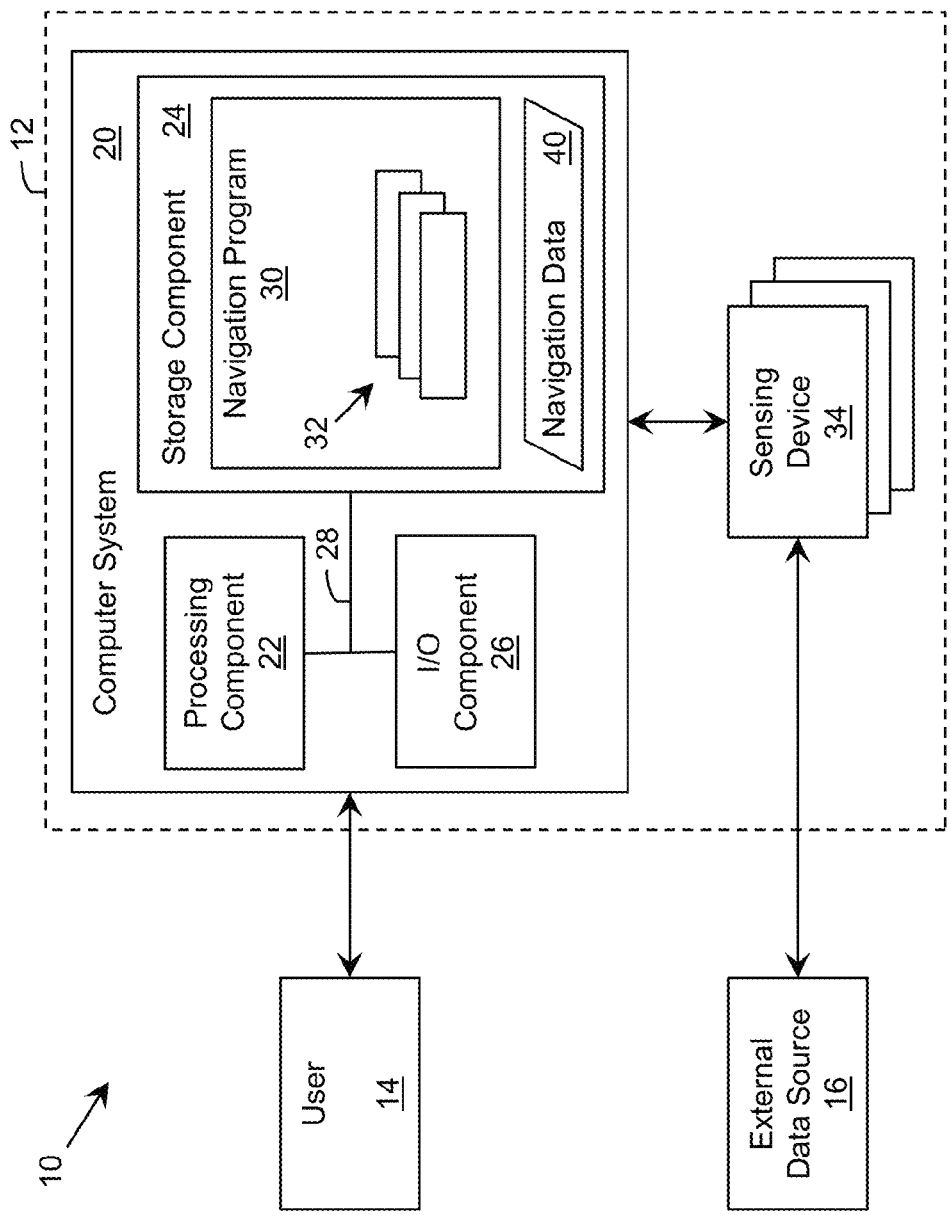
FIG. 1 shows an illustrative environment for managing movement of a vehicle according to an embodiment.

Turning to the drawings, FIG. 1 shows an illustrative environment 10 for managing movement of a vehicle 12 according to an embodiment. To this extent, the environment 10 includes a computer system 20 that can perform a process described herein in order to manage movement of the vehicle 12. In particular, the computer system 20 is shown including a navigation program 30, which makes the computer system 20 operable to manage movement of the vehicle 12 by performing a process described herein. While the computer system 20 is shown as being physically located on the vehicle 12, it is understood that the computer system 20, or portions thereof, can be located physically apart from the vehicle 12. In this case, the vehicle 12 can include one or more computing devices capable of communicating with the computer system 20, e.g., using a wireless solution.

The computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, the processing component 22 executes program code, such as the navigation program 30, which is at least partially fixed in storage component 24. While executing program code, the processing component 22 can process data, which can result in reading and/or writing transformed data from/to the storage component 24 and/or the I/O component 26 for further processing. The pathway 28 provides a communications link between each of the components in the computer system 20. The I/O component 26 can comprise one or more human I/O devices, which enable a human user 14 to interact with the computer system 20 and/or one or more communications devices to enable a system user 14 to communicate with the computer system 20 using any type of communications link. To this extent, the navigation program 30 can manage a set of interfaces (e.g., graphical user interface(s), application program interface, and/or the like) that enable human and/or system users 14 to interact with the navigation program 30. Furthermore, the navigation program 30 can manage (e.g., store, retrieve, create, manipulate, organize, present, etc.) the data, such as navigation data 40, using any solution.

In any event, the computer system 20 can comprise one or more general purpose computing articles of manufacture (e.g., computing devices) capable of executing program code, such as the navigation program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the navigation program 30 can be embodied as any combination of system software and/or application software.

Furthermore, the navigation program 30 can be implemented using a set of modules 32. In this case, a module 32 can enable the computer system 20 to perform a set of tasks used by the navigation program 30, and can be separately developed and/or implemented apart from other portions of the navigation program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 20.

When the computer system 20 comprises multiple computing devices, each computing device can have only a portion of the navigation program 30 fixed thereon (e.g., one or more modules 32). However, it is understood that the computer system 20 and the navigation program 30 are only representative of various possible equivalent computer systems that may perform a process described herein. To this extent, in other embodiments, the functionality provided by the computer system 20 and the navigation program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 20 includes multiple computing devices, the computing devices can communicate over any type of communications link. Furthermore, while performing a process described herein, the computer system 20 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

As discussed herein, the navigation program 30 enables the computer system 20 to manage movement of the vehicle 12. In an embodiment, the vehicle 12 is an unmanned vehicle, and the computer system 20 is configured to navigate the vehicle 12 in a fully automated manner. Alternatively, the vehicle 12 can be configured to be operated by a user 14 and include a computer system 20 capable of moving the vehicle 12 in a semi or fully automated manner for certain periods of time. Additionally, the vehicle 12 can be configured to be manually navigated by a user 14. Regardless, in each case the computer system 20 can be configured to provide information to a user 14 regarding the movement of the vehicle 12. The user 14 can be located on the vehicle 12, operating (e.g., teleoperating) the vehicle 12 from a remote location, monitoring the vehicle 12 from a remote location, and/or the like.

The vehicle 12 can be any size and/or type of vehicle 12. For example, the vehicle 12 can be a small device, such as a tread-driven unmanned ground vehicle (e.g., iRobot®, Packbot®, Talon® manufactured by QinetiQ, and/or the like). Alternatively, the vehicle 12 can be a larger vehicle, such as an automated truck navigating in a convoy. Still further, the vehicle 12 can be a waterborne vehicle, an aerial vehicle (e.g., such as a Predator combat drone), an amphibious vehicle, a rail vehicle, and/or the like.

Regardless, as part of managing the movement of the vehicle 12, the computer system 20 can receive a target location and plan a path to travel from the current location of the vehicle 12 to the target destination. The computer system 20 can determine the path using data obtained from a set of sensing devices 34. Each sensing device 34 can be configured to obtain (e.g., generate, acquire, and/or the like) data regarding one or more aspects of the environment of the vehicle 12. A sensing device 34 can automatically obtain the data in a periodic manner, obtain the data in response to a request, e.g., from the computer system 20, and/or the like. The sensing device 34 can include one or more sensors for generating data based on one or more attributes of the vehicle 12 and/or its surroundings. Additionally, the sensing device 34 can be configured to acquire data from an external data source 16. Regardless, each sensing device 34 can provide the data for processing by the computer system 20, which can store the data as navigation data 40.

In an embodiment, the vehicle 12 includes a plurality of types of sensing devices 34, each of which obtains a data corresponding to the environment of the vehicle 12. Illustrative types of data include a location (e.g., relative or absolute) of the vehicle 12, data corresponding to the environment of the vehicle 12 (e.g., data regarding the terrain, image data, data regarding objects present in the environment, and/or the like). Illustrative sensing devices 34 can include a global positioning system (GPS) device, one or more imaging devices, a local environment data source (e.g., an external imaging device, a weather condition source, a terrain attribute data source, and/or the like), and/or the like. However, it is understood that the types of sensing devices 34 and types of data are only illustrative, and the vehicle 12 can include any combination of various types of sensing devices 34, which are configured to obtain any combination of various types of data corresponding to the environment of the vehicle 12.

In any event, the computer system 20 can be configured to identify a path from a current location to a target location using a process described herein. To this extent, the computer system 20 can define a cost map grid for the surrounding area in which the vehicle 12 is located, which can be stored as navigation data 40. The cost map grid can be bounded or unbounded. In an embodiment, a size of each cell of the cost map grid corresponds to a minimal navigable area for the vehicle. In this case, the size of each cell can be selected based on a size and/or maneuverability of the vehicle 12. For example, the cells of the cost map grid can be squares with each side having a length proportional to a width and/or length of the vehicle 12. In an embodiment, each side of a cell has a length between approximately 0.25 and 1.5 times the width of the vehicle 12. Regardless, the size of each cell can be selected based on the size and maneuverability of the vehicle 12 (e.g., a bicycle versus a semi-trailer truck). In this manner, the computer system 20 can be configured to examine potential routes for the path on a scale commensurate with the size and maneuverability of the vehicle 12.

Figure 2:
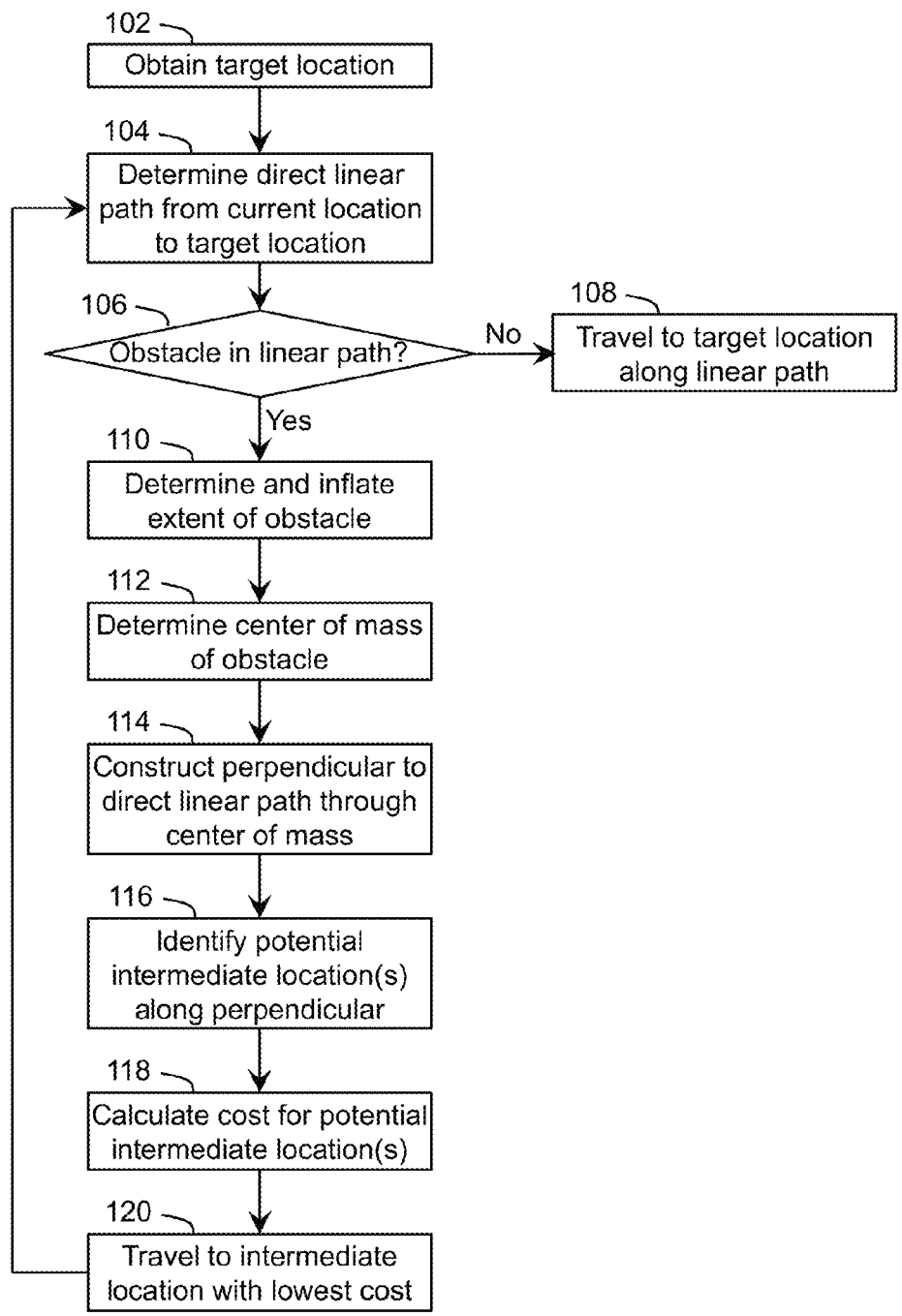
FIG. 2 shows an illustrative process for navigating a vehicle to a target location according to an embodiment.

FIG. 2 shows an illustrative process for navigating the vehicle 12 (FIG. 1) to a target location, which can be implemented by the computer system 20 (FIG. 1), according to an embodiment. Referring to FIGS. 1 and 2, in action 102, the computer system 20 can obtain a target location (e.g., waypoint) using any solution. For example, a user 14 can transmit a request to the computer system 20 for the vehicle 12 to move to the target location. The user 14 can be an external director, an external vehicle management system, and/or the like. Alternatively, the computer system 20 (e.g., an internal system responsible for larger-scale navigation planning) can determine the target location based on one or more automated or semi-automated tasks being performed by the vehicle 12. Regardless, the target location can be defined using any solution, such as absolute or relative coordinates (e.g., GPS coordinates), a pre-defined location within an operating area, and/or the like.

Figure 3C:
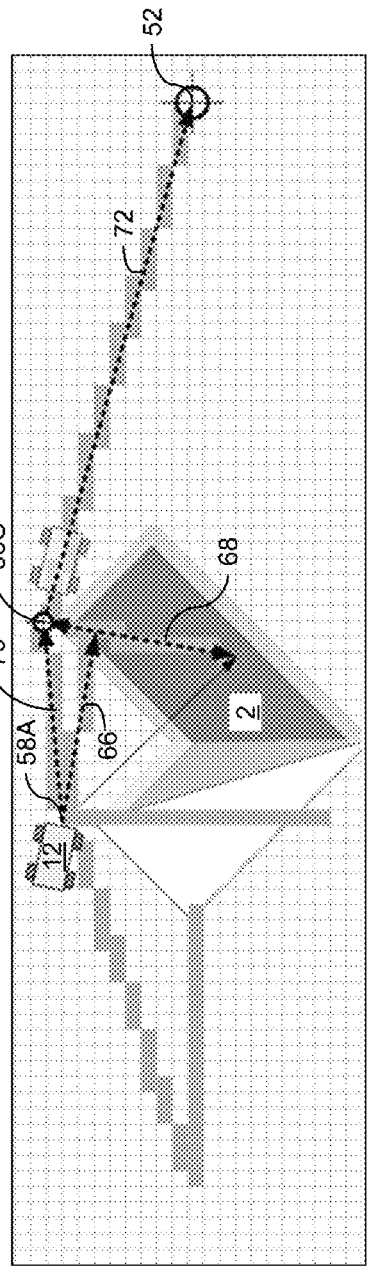

In response to obtaining the target location, the computer system 20 can plan a path from the current location to the target location and navigate the vehicle 12 to the target location. FIGS. 3A-3C show a vehicle 12 traveling from a first location 50 to a target location 52 according to an embodiment. Referring to FIGS. 1-3C, in action 104, the computer system 20 can determine a direct linear path 60 from the current location 50 of the vehicle 12 to the target location 52 using any solution. For example, the computer system 20 can use a standard geometric solution for the cost map grid coordinate system.

In action 106, the computer system 20 can determine whether the linear path 60 includes any obstacles 2 between the vehicle 12 and the target location 52. For example, the computer system 20 can evaluate each cell of the cost map grid located along the linear path 60 until either an obstacle 2 is detected in the path 60 or all cells from the current location 50 to the target location 52 have been evaluated. The computer system 20 can perform the evaluation using any solution. For example, the computer system 20 can use image data acquired by an imaging device located on the vehicle 12 to evaluate whether any obstacles 2 (particularly movable objects) are present. Furthermore, the computer system 20 can use map data for the surrounding environment to evaluate for the presence of any obstacles 2 along the path 60.

When the computer system 20 does not detect an obstacle 2, in action 108, the computer system 20 can instruct the vehicle 12 to travel to the target location 52 along the linear path 60. While traveling, the computer system 20 can monitor the path 60 for any previously unidentified obstacles 2 (e.g., objects moving into the path 60, a ditch or other unnavigable terrain, and/or the like). In the event the computer system 20 detects a new obstacle 2 prior to arriving at the target location 52, the process can return to action 104. In an embodiment, the computer system 20 can distinguish fixed obstacles from movable/moving obstacles. For an obstacle that is moving/recently moved, the computer system 20 can stop the vehicle 12 for a period of time (e.g., thirty seconds) to provide an opportunity for the object to move out of the path 60 prior to returning to action 104 and determining a new path.

When the computer system 20 detects an obstacle 2 in action 106, in action 110, the computer system 20 can determine and inflate an extent of the obstacle 2. The computer system 20 can determine the extent of the obstacle 2 using any solution. For example, the vehicle 12 can include a sensing device 34, such as a laser line scanner (e.g., such as a device available from SICK, Inc.), an ultrasonic range finding system, stereo imaging device(s), and/or the like, which can provide sufficiently accurate information as to the presence and location of various types of obstacles 2 along a field of view/scan field. Using this information, the computer system 20 can calculate an apparent extent 54A, 54B of the obstacle 2 on either side of the path 60. Furthermore, the computer system 20 can utilize information regarding known obstacles present the surrounding area to obtain an actual extent of an obstacle 2 known to be present. In either case, the computer system 20 can inflate the extents 54A, 54B of the obstacle 2 by an amount sufficient to account for the dimensions of the vehicle 12 to obtain inflated extents 54A, 54B of the obstacle 2. For example, assuming the computer system 20 navigates a centerline of the vehicle 12 to a location, the extents 54A, 54B of the obstacle 2 can be inflated by at least one half of the width of the vehicle 12.

In action 112, the computer system 20 can determine a center of mass of the inflated extents 56A, 56B of the obstacle 2 using any solution. The center of mass can correspond to an actual center of mass when the extent of the obstacle 2 is known or an apparent center of mass when the extent of the obstacle 2 is based on partial information regarding the obstacle 2 (e.g., only the visible portion as indicated by the darker portion of the obstacle 2 shown in FIG. 3B). In action 114, the computer system 20 can construct a perpendicular line 62 to the path 60, which intersects the calculated center of mass for the inflated extents of the obstacle 2.

In action 116, the computer system 20 can identify a set of potential intermediate locations 58A, 58B along the perpendicular line 62 using any solution. For example, the computer system 20 can evaluate cells along the perpendicular line 62 from either side of the path 60 until a cell is identified for which there are no obstacles present between the current location 50 and the intermediate locations 58A, 58B. In action 118, the computer system 20 can calculate a cost for traveling to each potential intermediate location 58A, 58B using any solution. For example, the computer system 20 can calculate the cost of a potential intermediate location 58A, 58B based on the distance required to travel to the potential intermediate location 58A, 58B, a distance from the path 60 for the potential intermediate location 58A, 58B, a presence of one or more known obstacles between the potential intermediate location 58A, 58B and the target location 52, and/or the like.

In action 120, the computer system 20 can select the potential intermediate location 58A, 58B having the lowest cost, e.g., intermediate location 58A as shown in FIG. 3B, calculate a linear path 64 to the intermediate location 58A, instruct the vehicle 12 to travel to the selected intermediate location 58A along the linear path 64, and monitor the vehicle 12 as described herein in conjunction with action 108. When two or more potential intermediate locations 58A, 58B have the same cost, the computer system 20 can select one of the potential intermediate locations 58A, 58B using any solution (e.g., randomly). Additionally, the computer system 20 can calculate a new path 66 from the intermediate location 58A to the target location 52 to complete a path between the starting location 50 and the target location 52 via the intermediate location 58A.

Regardless, the process can be repeated for one or more intermediate locations 58A. For example, as shown in FIG. 3C, once the vehicle 12 arrives at the intermediate location 58A, an obstacle along the path 66 is visible (e.g., an additional portion of the obstacle 2), which requires the computer system 20 to identify and select another intermediate location 58C through which to travel in order to travel to the target location 52. When located at the intermediate location 58A, the computer system 20 cannot locate a potential intermediate location on one side of the path 66 as the extent of the obstacle 2 extends beyond a field of view of the sensing device(s) of the vehicle 12. In this case, the end of the field of view can be used as an extent of the obstacle 2 in order for the computer system 20 to calculate a center of mass and the corresponding perpendicular line 68, which the computer system 20 can use to identify the intermediate location 58C and the corresponding path 70. Once at the intermediate location 58C, the computer system 20 identifies a clear linear path 72 to the target location 52 and the vehicle 12 can travel thereto along the path 72 as described herein.

It is understood that the process described herein is only illustrative, and numerous variations and/or enhancements can be implemented by the computer system 20. For example, to prevent the computer system 20 from continually looping (infinite recursion), the computer system 20 can initiate the process with a condition that will cause it to stop. The condition can be simple or complex. For example, the condition can instruct the computer system 20 to stop the process when all available courses of travel are duplicates of previously attempted routes, if the edges of an obstacle cannot be discerned in either direction, and/or the like. In response to stopping the process prior to arriving at the target location 52, the computer system 20 can provide an error message to, for example, a user 14. The user 14 can manually define a route for the vehicle 12, retrieve the vehicle 12, and/or the like.

In an embodiment, the computer system 20 assigns a cost to cells on the cost map grid that are evaluated. For example, a cell can be assigned a value of zero when no obstacle is present between the vehicle 12 and the cell and a value of one when an obstacle is detected. Alternatively, the computer system 20 can assign a varying cost based on additional data regarding the corresponding cell. For example, using scanning data for an area using an image based or other type of scanning solution implemented on the vehicle 12, the computer system 20 can evaluate a difficulty of traversing terrain, which is not itself an obstacle, corresponding to a cell and assign a weight to the cell based on the evaluated difficulty. The scanning data can include a slope of the terrain, a composition/consistency (e.g., mud versus dry earth) of the terrain, vegetation (e.g., overgrowth) and/or clutter present on the terrain, and/or the like. In this case, the computed cost for a possible path can include consideration of the weight(s) assigned to the cells. In another embodiment, a weight is applied to the entire path rather than to individual cells along the path.

In either case, the weighting can enable the computer system 20 to choose a longer, but potentially easier and safer, route for the vehicle 12 to travel. Furthermore, the computer system 20 can use different thresholds for the difficulty. For example, terrain with a weight greater than a certain amount can be treated as a possible obstacle and the computer system can use the process described herein to determine if lower-cost alternative paths are available. If none are found, the computer system 20 can navigate the vehicle 12 along the original straight line path.

When the computer system 20 has additional data regarding an obstacle and not just data available within a line of sight from the vehicle, the computer system 20 can utilize the additional data in a process described herein. For example, the full extent of an obstacle 2 can be used during a replanning action, which can result in a reduced number of instances in which the course of the vehicle 12 requires replanning. Similarly, the data can include information regarding a previously utilized or attempted route, which the computer system 20 can incorporate in selecting a route to be currently utilized.

Furthermore, while aspects of the invention have been shown and described in conjunction with a ground-based vehicle 12 application, which therefore assumes a generally two-dimensional environment, it is understood that aspects of the invention can be directed to three-dimensional applications (e.g., aerial, outer space, underwater, and/or the like). In this case, the process described herein can evaluate obstacle dimensions along two perpendicular axes (e.g., up-down and left-right relative to the vehicle 12) to an original plotted direction of travel. Two centers of mass and the corresponding perpendicular lines can be determined, one for each axis, and similar actions can be performed for each axis as described herein. The computer system 20 can compare possible intermediate locations and select the closest overall. Alternatively, the computer system 20 can construct vectors from adjacent possible intermediate locations. However, when using vectors, additional obstacles may be encountered as the computer system 20 does not check until required. In any event, the solution would generally result in paths that are not perfectly optimal, which are located with very low computational cost (e.g., a near-minimum number of cells may be examined) and can be easily followed by the vehicle 12.

Using a process described herein, the computer system 20 is required to check a relatively small number of cells as compared to the overall area. For example, as shown in FIG. 3C, the cells are identified by the light gray shading, and include the cells: along the paths 60, 66 until the obstacle 2; cells along the perpendicular lines 62, 68 between the two potential intermediate locations 58A, 58B (line 62) or between the potential intermediate location 58C and the end of the field of view of the vehicle 12; and cells along the paths 64, 70, 72 traveled by the vehicle 12. By utilizing a calculate, then check approach, the process described herein is scalable to large environments.

Figure 4:
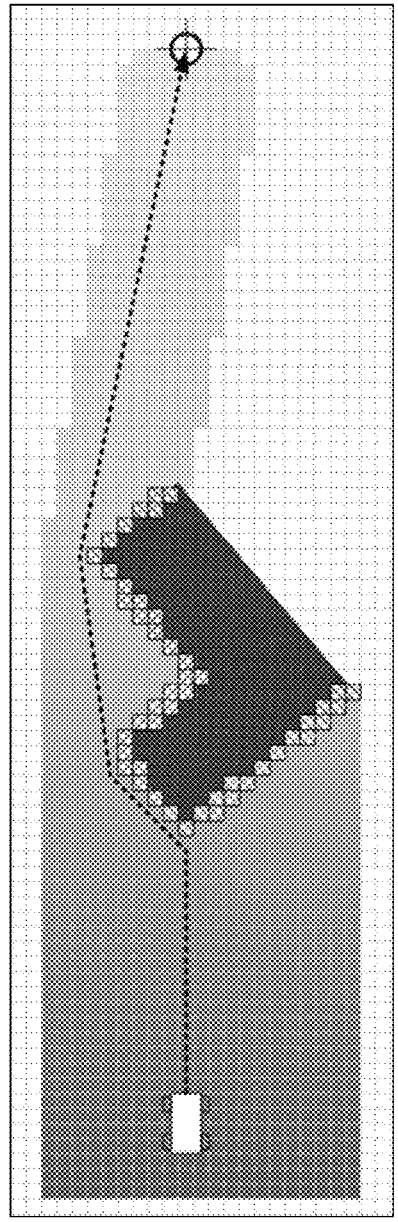
FIG. 4 shows an example of a path planning solution according to the prior art.

In contrast, other prior art approaches are not scalable since these approaches, in effect, attempt to evaluate a large number of possible pathways and route options which are not necessary. For example, FIG. 4 shows an example of a path planning solution according to the prior art. In this case, the objective is the same as that shown and described in conjunction with FIGS. 3A-3C. However, the path planning is performed using an approach based on the A* method. With A* method path planning, each cell along a route is examined and assigned a cost based on the distance from the target location. All examined, but available cells are shown in varying shades of gray in FIG. 4 to represent the corresponding varying costs for the cells. If an obstacle is detected, the corresponding cells are effectively assigned an infinite cost. A route is constructed based on the costs associated with the cells and the required direction of travel. As illustrated in FIG. 4, the examined cells cover a significantly wider area than all of the examined cells shown in FIG. 3C.

The process described herein places significantly less computational demands on the computer system 20, both in the reduction of total map cells that require examination, and in the processing that is performed to determine the route. In contrast, prior art approaches expend significant computational effort to determine the "best route" from the set of surveyed cells, while the process described herein computes line segments. While the process described herein may not identify a route having the absolute shortest distance/cost, the identified route is sufficiently effective and fast for most applications. Additionally, the identified route requires drastically less computational load, making it more practical in numerous applications, such as for use in unmanned vehicles 12 having relatively small size and power.

In an illustrative application, the vehicle 12 is an unmanned vehicle operating in a rail yard. The vehicle 12 can comprise a wheeled and/or tracked navigation system that allows it to freely move within the rail yard. In an environment such as a rail yard, numerous fixed obstacles are present, which can be avoided by defining a global array of waypoints throughout the rail yard. In this case, the vehicle 12 can use the predefined waypoints to navigate within the rail yard while using the process described herein to avoid transient obstacles (e.g., cargo containers, parked rail cars, and/or the like), which also are typically present within the rail yard.

While shown and described herein as a method and system for navigating a vehicle, it is understood that aspects of the invention further provide various alternative embodiments. For example, in one embodiment, the invention provides a computer program fixed in at least one computer-readable medium, which when executed, enables a computer system to navigate a vehicle. To this extent, the computer-readable medium includes program code, such as the navigation program 30 (FIG. 1), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as the navigation program 30 (FIG. 1), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for navigating a vehicle. In this case, the generating can include configuring a computer system, such as the computer system 20 (FIG. 1), to implement the method of navigating a vehicle. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method comprising:
a computer system automatically navigating a vehicle from a current location to a target location, wherein the navigating includes:
selecting a set of linear paths for the vehicle to travel between the current location and the target location, the selecting including, for each linear path in the set of linear paths:
identifying a current linear path between the current location and the target location;
evaluating a set of cells along the current linear path for a presence of an obstacle;
instructing the vehicle to travel along the current linear path in response to evaluating all cells between the current location and the target location along the current linear path as not including an obstacle; and
in response to evaluating a cell in the set of cells as including an obstacle:
determining a center of mass corresponding to an extent of the obstacle;
identifying a set of potential locations based on the center of mass, a line through the center of mass and perpendicular to the current linear path, and the extent of the obstacle;
selecting a potential location in the set of potential locations as the intermediate location based on the extent of the obstacle and the current linear path; and
instructing the vehicle to travel along a distinct linear path from the current location to the intermediate location.

2. The method of claim 1, wherein each cell corresponds to a minimal navigable area selected based on at least one of: a size or a maneuverability of the vehicle.

3. The method of claim 1, wherein the selecting further includes, in response to evaluating a cell in the set of cells as including an obstacle, inflating the extent of the obstacle based on a size of the vehicle, wherein the determining a center of mass and the identifying a set of potential locations uses the inflated extent of the obstacle.

4. The method of claim 3, wherein the selecting further includes, in response to evaluating a cell in the set of cells as including an obstacle, calculating a cost for each of a plurality of potential locations in the set of potential locations, wherein the intermediate location corresponds to the potential location having a lowest cost.

5. The method of claim 1, the navigating further including obtaining data corresponding to a set of known attributes for the obstacle, wherein the extent of the obstacle is based on the set of known attributes for the obstacle.

6. The method of claim 1, further comprising the computer system receiving the target location from a user, wherein the computer system automatically navigates the vehicle to the target location in response to receiving the target location.

7. The method of claim 1, further comprising the computer system automatically identifying the target location based on a task being performed by the vehicle, wherein the computer system automatically navigates the vehicle to the target location in response to identifying the target location.

8. The method of claim 1, further comprising calculating an apparent extent of the obstacle using data corresponding to a location of the obstacle, wherein the determining a center of mass uses the apparent extent as the extent of the obstacle.

9. A system comprising:
a computer system to manage movement of a vehicle by performing a method comprising automatically navigating the vehicle from a current location to a target location, wherein the navigating includes:
selecting a set of linear paths for the vehicle to travel between the current location and the target location, the selecting including, for each linear path in the set of linear paths:
identifying a current linear path between the current location and the target location;
evaluating a set of cells along the current linear path for a presence of an obstacle;
instructing the vehicle to travel along the current linear path in response to evaluating all cells between the current location and the target location along the current linear path as not including an obstacle; and
in response to evaluating a cell in the set of cells as including an obstacle:
determining a center of mass corresponding to an extent of the obstacle;
identifying a set of potential locations based on the center of mass, a line through the center of mass and perpendicular to the current linear path, and the extent of the obstacle;
selecting a potential location in the set of potential locations as the intermediate location based on the extent of the obstacle and the current linear path; and
instructing the vehicle to travel along a distinct linear path from the current location to the intermediate location.

10. The system of claim 9, further comprising the vehicle, wherein the computer system is located on the vehicle.

11. The system of claim 9, wherein the selecting further includes, in response to evaluating a cell in the set of cells as including an obstacle, inflating the extent of the obstacle based on a size of the vehicle, wherein the determining a center of mass and the identifying a set of potential locations uses the inflated extent of the obstacle.

12. The system of claim 11, wherein the selecting further includes, in response to evaluating a cell in the set of cells as including an obstacle, calculating a cost for each of a plurality of potential locations in the set of potential locations, wherein the intermediate location corresponds to the potential location having a lowest cost.

13. The system of claim 9, the navigating further including obtaining data corresponding to a set of known attributes for the obstacle, wherein the extent of the obstacle is based on the set of known attributes for the obstacle.

14. The system of claim 9, further comprising the computer system receiving the target location from a user, wherein the computer system automatically navigates the vehicle to the target location in response to receiving the target location.

15. The system of claim 9, further comprising the computer system automatically identifying the target location based on a task being performed by the vehicle, wherein the computer system automatically navigates the vehicle to the target location in response to identifying the target location.

16. The system of claim 9, wherein the vehicle is operating in a rail yard, and wherein the target location corresponds to one of a plurality of waypoints throughout the rail yard, each waypoint corresponding to a location within the rail yard.

17. A computer program product comprising program code stored on at least one non-transitory computer-readable medium, which when executed, enables a computer system to implement a method of managing movement of a vehicle, the method comprising:
automatically navigating a vehicle from a current location to a target location, wherein the navigating includes:
selecting a set of linear paths for the vehicle to travel between the current location and the target location, the selecting including, for each linear path in the set of linear paths:
identifying a current linear path between the current location and the target location;
evaluating a set of cells along the current linear path for a presence of an obstacle;
instructing the vehicle to travel along the current linear path in response to evaluating all cells between the current location and the target location along the current linear path as not including an obstacle; and
in response to evaluating a cell in the set of cells as including an obstacle:
determining a center of mass corresponding to an extent of the obstacle;
identifying a set of potential locations based on the center of mass, a line through the center of mass and perpendicular to the current linear path, and the extent of the obstacle;
selecting a potential location in the set of potential locations as the intermediate location based on the extent of the obstacle and the current linear path; and
instructing the vehicle to travel along a distinct linear path from the current location to the intermediate location.

18. The computer program product of claim 17, wherein the selecting further includes, in response to evaluating a cell in the set of cells as including an obstacle, inflating the extent of the obstacle based on a size of the vehicle, wherein the determining a center of mass and the identifying a set of potential locations uses the inflated extent of the obstacle.

19. The computer program product of claim 18, wherein the selecting further includes, in response to evaluating a cell in the set of cells as including an obstacle, calculating a cost for each of a plurality of potential locations in the set of potential locations, wherein the intermediate location corresponds to the potential location having a lowest cost.

20. The computer program product of claim 17, further comprising the computer system receiving the target location from a user, wherein the computer system automatically navigates the vehicle to the target location in response to receiving the target location.

21. The computer program product of claim 17, further comprising the computer system automatically identifying the target location based on a task being performed by the vehicle, wherein the computer system automatically navigates the vehicle to the target location in response to identifying the target location.

* * * * *